US008663500B2

(12) United States Patent
Emoto et al.

(10) Patent No.: US 8,663,500 B2
(45) Date of Patent: Mar. 4, 2014

(54) α-SIALON PHOSPHOR, METHOD FOR PRODUCING SAME, AND LIGHT-EMITTING DEVICE (75) Inventors: Hideyuki Emoto, Machida (JP); Mitsuru Kawagoe, Machida (JP); Tomohiro Nomiyama, Machida (JP)

(73) Assignee: Denki Kagaku Kogyo Kabushiki Kaisha, Tokyo (JP)

(*) Notice: Subject to any disclaimer, the term of this patent is extended or adjusted under 35 U.S.C. 154(b) by 221 days.

(21) Appl. No.: 13/145,591

(22) PCT Filed: Jan. 26, 2010

(86) PCT No.: PCT/JP2010/050989
§ 371 (c)(1),
(2), (4) Date: Jul. 21, 2011

(87) PCT Pub. No.: WO2010/087348
PCT Pub. Date: Aug. 5, 2010

(65) Prior Publication Data
US 2011/0279018 A1 Nov. 17, 2011

(30) Foreign Application Priority Data
Jan. 27, 2009 (JP) ................. 2009-015083

(51) Int. Cl.
*C09K 11/08* (2006.01)
*H01L 33/50* (2010.01)
(52) U.S. Cl.
USPC .................................. 252/301.4 F
(58) Field of Classification Search
USPC .................................. 252/301.4 F
See application file for complete search history.

(56) References Cited

U.S. PATENT DOCUMENTS

| | | | |
|---|---|---|---|
| 6,632,379 B2 * | 10/2003 | Mitomo et al. | 252/301.4 R |
| 7,074,346 B2 * | 7/2006 | Yamada et al. | 252/301.4 F |
| 7,144,524 B2 * | 12/2006 | Sakata et al. | 252/301.4 F |
| 7,402,943 B2 * | 7/2008 | Sakuma et al. | 313/503 |
| 7,825,580 B2 * | 11/2010 | Hirosaki et al. | 313/503 |
| 2007/0166218 A1 | 7/2007 | Hirosaki et al. | |
| 2009/0021141 A1 | 1/2009 | Emoto et al. | |
| 2009/0085465 A1 | 4/2009 | Hirosaki et al. | |

FOREIGN PATENT DOCUMENTS

| | | | |
|---|---|---|---|
| EP | 2022835 | * | 2/2009 |
| JP | 2002-363554 | | 12/2002 |
| JP | 2003-124527 | | 4/2003 |
| JP | 2005-307012 | | 11/2005 |
| JP | 2006-28295 | | 2/2006 |
| JP | 2007-308593 | | 11/2007 |

OTHER PUBLICATIONS

Translation for JP 2005-307012, Nov. 2005.*

(Continued)

*Primary Examiner* — Carol M Koslow
(74) *Attorney, Agent, or Firm* — Stein IP, LLC (57) ABSTRACT

α-sialon phosphor that is α-sialon represented by a general expression: $(M)_x(Eu)_y(Si, Al)_{12}(O, N)_{16}$ (where M is one or more types of elements selected from a group consisting of Li, Mg, Ca, and Y as well as lanthanide element (except for La and Ce) and including at least Ca), the α-sialon phosphor being structured so that an oxygen content is 1.2 mass % or less and primary particles constituting the α-sialon have a columnar shape. When the α-sialon phosphor receives ultraviolet rays or visible light having a wavelength from 250 to 500 nm as an excitation source, the α-sialon phosphor shows a fluorescent characteristic having a peak in a wavelength region from 595 to 630 nm.

13 Claims, 4 Drawing Sheets

(56) References Cited

OTHER PUBLICATIONS

Ken Sakuma et al., "Warm-white light-emitting diode with yellowish orange SiAlON ceramic phosphor," *Optics Letters*, vol. 29, No. 17, Sep. 1, 2004, pp. 2001-2003.

International Search Report mailed Mar. 2, 2010 in International Application No. PCT/JP2010/050989.

* cited by examiner

α-SIALON PHOSPHOR, METHOD FOR PRODUCING SAME, AND LIGHT-EMITTING DEVICE

CROSS-REFERENCE TO RELATED APPLICATIONS

This application claims the benefit of PCT International Patent Application No. PCT/JP2010/050989, filed Jan. 26, 2010, and Japanese Patent Application No. 2009-015083, filed Jan. 27, 2009, in the Japanese Patent Office, the disclosures of which are incorporated herein by reference.

BACKGROUND OF THE INVENTION

1. Field of the Invention

The present invention relates to α-sialon phosphor that is excited by ultraviolet rays or blue light to emit orange or red light, method for producing same, and a light-emitting apparatus using the α-sialon phosphor.

2. Description of the Related Art

As nitride or oxynitride phosphor, α-sialon phosphor has been known to be superior not only in the fluorescent emission efficiency but also in the temperature characteristic. In particular, europium doped α-sialon phosphor is excited in a wide wavelength region from ultraviolet rays to blue light to emit yellow to orange light. Thus, this α-sialon phosphor has been examined to be used as a yellow phosphor as a substitute for YAG:Ce or to be used as an incandescent color Light Emitting Diode (LED) phosphor that has a low color temperature (Patent Literatures 1 and 2, Non-Patent literature 1).

The α-sialon is structured so that the Si—N bond of an α-silicon nitride crystal is partially substituted with an Al—N bond and an Al—O bond and, in order to maintain the electroneutrality, specific elements (Ca and Li, Mg, and Y, or lanthanide elements except for La and Ce) are penetrated and solid-solute to the crystal lattice. A part of the elements thus ingressed and solid-soluted functions as a light emission center element, thereby providing a fluorescent characteristic. The α-sialon can be synthesized, for example, by subjecting, to a heat treatment in a nitrogen atmosphere, mixed powders of silicon nitride, aluminum nitride, and the oxides of the ingressed and solid-soluted elements including a light emission center. Oxides of the ingressed and solid-soluted elements also include compounds that turn into oxides by a heat treatment. In the case of this synthesization method, oxides are used as a raw material, thus inevitably causing the synthesization of α-sialon in which a certain amount of oxygen is ingressed and solid-soluted. In the case of a α-sialon phosphor having a superior fluorescent characteristic in which Ca and Eu as a light emission center are ingressed and solid-soluted, α-sialon in which a certain amount of oxygen is ingressed and solid-soluted emits yellow to orange light (having a fluorescent peak wavelength of about 580 nm).

On the other hand, α-sialon having low oxygen content rate synthesized by using calcium nitride as a calcium raw material can have a calcium solid solution ingressed therein to have a higher concentration than in the case of the known α-sialon as described above. It has been known that, if the Ca solute concentration is high in particular, such a phosphor is obtained that has a fluorescent peak wavelength at the higher wavelength-side (595 nm or more) than in the case of the conventional composition using an oxide raw material (Patent Literature 3). In addition to α-sialon, a nitride phosphor having low oxygen content has been reported (Patent Literature 4).

CITATION LIST

Patent literature

Patent literature 1: JP 3668770 B
Patent Literature 2: JP 2003-124527 A
Patent Literature 3: JP 2005-307012 A
Patent Literature 4: JP 2006-28295 A Non-Patent Literature Non-Patent Literature 1: Ken Sakuma et al. "Warm-white light-emitting diode with yellowish orange SiAlON ceramic phosphor", OPTICS LETTERS, 29 (17), 2001-2003 (2004)

SUMMARY OF THE INVENTION

The first objective of the present invention is to provide an α-sialon phosphor having a low oxygen content rate that has a fluorescent peak at a wavelength of 595 nm or more and that has a superior light-emitting efficiency to in the conventional phosphor. The second objective of the present invention is to provide a method of manufacturing an α-sialon phosphor that has a superior fluorescent characteristic, that has large primary particles, and that has a superior crystallinity. The third objective of the present invention is to provide such a light-emitting apparatus using this α-sialon phosphor that has a favorable light-emitting characteristic.

The inventors have paid attention on and investigated calcium nitride raw material powders with regard to the method for producing $Eu^{2+}$ doped Ca-α-sialon phosphor powders having a low oxygen content rate. As a result, the inventors have found that, oxygen, which is impurity included in calcium nitride powders, has a significant influence on the grain growth behavior of the α-sialon. According to a further research based on this finding, an appropriate range of the amount of calcium-derived oxygen has resulted in phosphor composed of particles that have a high aspect ratio, that have a large particle diameter, and that have a smooth surface. Thus, the inventors have reached the present invention by finding that such α-sialon phosphor has a superior fluorescent characteristic that is obtained by developing primary particles composed of a substantially single crystal, and that is composed of particles having a high aspect ratio, a large particle diameter and a smooth surface.

The present invention is α-sialon represented by the following general expression: $(M)_x(Eu)_y(Si, Al)_{12}(O, N)_{16}$ (where M is one or more types of elements selected from a group consisting of Li, Mg, Ca, and Y as well as lanthanide element except for La and Ce), wherein an oxygen content is 1.2 mass % or less and primary particles constituting the α-sialon have a columnar shape. Preferably, the primary particles have an average aspect ratio of 2 or more and 50 or less.

The α-sialon constituting the phosphor has a lattice constant a in a range from 0.785 to 0.800 nm, a lattice constant c in a range from 0.570 to 0.580 nm, and an Eu content in a range from 0.2 to 1.7 mass %. Preferably, when the α-sialon phosphor receives ultraviolet rays or visible light having a wavelength in a range from 250 to 500 nm as an excitation source, the α-sialon phosphor shows a fluorescent characteristic that has a peak in a wavelength region in a range from 595 to 630 nm.

The α-sialon phosphor of the present invention is powder-like α-sialon phosphor obtained by subjecting the α-sialon to grinding or pulverization. The α-sialon phosphor has a particle diameter distribution 50 volume % diameter (D50) measured by a laser diffraction-scattering of 5 μm or more and 20 μm or less. Preferably, the particle diameter distribution 10% volume diameter (D10) measured by the laser diffraction-scattering is 2 μm or more and 15 μm or less and the particle diameter distribution 90% volume diameter (D90) is 6 μm or more and 50 μm or less.

A method of manufacturing the α-sialon phosphor of the present invention is a method of manufacturing α-sialon represented by the following general expression: $(M)_x(Eu)_y(Si, Al)_{12}(O, N)_{16}$ (where M is Li, Mg, Ca, and Y and a lanthanide element (except for La and Ce)), wherein Ca raw material having $CaO/Ca_3N_2$ (molar ratio) adjusted within a range from 0.04 to 0.3 is subjected to a heat treatment for sintering.

Furthermore, the present invention is a light-emitting apparatus that includes a light source and one or more types of phosphors that emit visible light when receiving light emitted from a light source, wherein at least the phosphor is used.

The α-sialon phosphor having a low oxygen content rate of the present invention has large primary particles and has a superior crystallinity. Thus, the α-sialon phosphor has a superior fluorescent characteristic and has a high aspect ratio, thus causing a weak sintering force among particles. Thus, the secondary particles can be easily dissociated by grinding and pulverization processings. Therefore, the pulverization in a particle size control step can be suppressed from causing a crystal defect. Thus, the α-sialon phosphor of the present invention can maintain, even when having a powder-like shape, a superior fluorescent characteristic at an initial stage.

The producing method of the present invention can provide an α-sialon phosphor that has a superior fluorescent characteristic, that has large primary particles, that has a superior crystallinity, and that has a superior fluorescent characteristic.

Furthermore, the light-emitting apparatus of the present invention uses the α-sialon phosphor having a superior fluorescent characteristic of the present invention, thus providing a favorable light-emitting characteristic.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

The present invention will be described in detail based on some Examples. However, the present invention is not limited to these Examples and can be subjected to various modifications within the scope of the inventions of the claims. Such modifications are also included in the scope of the present invention.

The α-sialon is solid solution in which a Si—N bond in a-silicon nitride is partially substituted with an Al—N bond and an Al—O bond and the electroneutrality is maintained by allowing specific cations to ingress into the lattice. The α-sialon is represented by a general expression of $M_z(Si, Al)_{12}(O, N)_{16}$. In the formula, M represents an element that can ingress into the lattice and is Li, Mg, Ca, Y as well as a lanthanide element except for La and Ce. The solid solution amount z of M is a value determined by a substitutional rate of the Si—N bond with the Al—N bond.

In order to allow the fluorescent characteristic of the α-sialon to appear, it is required to partially constitute M by an element that can be solid-soluted and that can function as a light emission center. Since Ca is used for M in particular, the α-sialon can have stabilized crystals in a wide composition range. By selecting Eu for a part of M as a light emission center, such phosphor is obtained that is excited by light in a wide wavelength region from ultraviolet rays to blue light and that shows a visible light emission from yellow to orange.

The light emission wavelength changes depending on the composition of the solid solution of the α-sialon (i.e., substitutional rates of a Si—N bond with an Al—N bond and an Al—O bond (which are represented by m and n, respectively)) as well as the Eu solute concentration. By increasing the Eu solute concentration as a light emission center, the light emission wavelength shifts to the long wavelength-side. However, the shift amount is small and the shift also causes a change in the emission intensity. Thus, this is not suitable for a control factor. Eu, which is solid-soluted in the lattice of the α-sialon, exists as a divalent cation and has the excitation and fluorescence by the 4f-5d transition and has the light emission wavelength that is significantly influenced by the $Eu^{2+}$ coordination environment. Thus, by controlling the solid solution composition of the α-sialon, the light emission wavelength can be controlled in a wide range while maintaining the emission intensity.

By allowing the α-sialon to have a high value m and a low value n, the light emission wavelength can be shifted to the long wavelength-side. The range within which the value m may thermodynamically maintain the α-sialon is wider as the value n is lower. Specifically, it is advantageous to reduce the oxygen amount in crystals. Thus, the α-sialon phosphor of the present invention preferably includes an oxygen content that exceeds 0 and that is 1.2 mass % or lower.

The α-sialon represented by the general expression: $(M)_x(Eu)_y(Si, Al)_{12}(O, N)_{16}$ has a solid solution composition that is represented by x and y in the expression and the Si/Al ratio and the O/N ratio associated therewith. The solid solution composition of the α-sialon to be synthesized cannot be strictly defined by a composition analysis for example because of the second crystalline phase different from the α-sialon and the noncrystalline phase whose existence cannot be avoided. It has been known that the solid solution composition of the α-sialon has a close relation with the crystal lattice size. In other words, by specifying the lattice constant, the true solid solution composition of the α-sialon can be specified. According to the research by the inventors, when the α-sialon has the lattice constant a in a range from 0.785 to 0.800 nm and the lattice constant c in a range from 0.570 to 0.580 nm, the fluorescent peak wavelength of 595 nm or more is obtained. The content of Eu as a light emission center is preferably in a range from 0.2 to 1.7 mass %. The Eu content lower than 0.2 mass % causes a small contribution to the light emission and the Eu content exceeding 1.7 mass % causes the fluoresce concentration quenching due to the energy transfer between $Eu^{2+}$, which is not preferred.

The crystalline phase existing in the phosphor is preferably the α-sialon single phase but also may include other crystalline phases such as β-sialon, aluminum nitride, and the polytypoids thereof in a very small amount so long as no influence is caused on the light-emitting characteristic.

Generally, the α-sialon is obtained by heating mixed powders composed of silicon nitride, aluminum nitride, and ingressed solid solution elements in a nitrogen atmosphere of a high temperature to cause the reaction thereof. During a temperature rising process, constituents partially form a liquid phase through which substances move to thereby generating the α-sialon solid solution. Thus, the α-sialon after synthesized, it forms conglomerate secondary particles by the sintering of a plurality of isometric primary particles. The term "primary particles" herein means the minimum particles that can be observed by an electron microscope for example and that can exist independently.

The inventors have reached the present invention by investigating the relation between the light-emitting characteristic and the particle property to thereby find that the α-sialon of columnar particles improves the light-emitting characteristic.

Specifically, the phosphor of the present invention is characterized in that the primary particles have a columnar shape. The particles having a columnar shape are in a state close to a single crystal state and have a superior crystallinity and thus can suppress the optical absorption such as a defect. Furthermore, the particles having a columnar shape have a reduced contact area and thus have an effect of suppressing the sintering of the particles. In the case of white LED for example, the phosphor must have an appropriate particle size because the phosphor is used by being dispersed in resin. The α-sialon that is composed of secondary particles that is composed of isometric particles has a particle size larger than the size required for phosphor, thus requiring pulverization and classification processings. The secondary particles are very tightly-bound and thus not only require a strong pulverization but also cause defects in a pulverization process that have an adverse influence on the light-emitting characteristic. The phosphor of the present invention can provide a weak bond among the primary particles. Thus, the primary particles can be dispersed by a weak pulverization force while minimizing the generation of defects, thus suppressing the reduction of the light-emitting characteristic in the particle size control.

The aspect ratio showing the level of the columnar shape of the primary particles, which is a value obtained by dividing the length of the long axis of the particle by the length of the short axis, is preferably 2 or more and 50 or less. The reason is that the aspect ratio lower than 2 reduces the favorable crystallinity or the effect of suppressing the sintering among particles and the aspect ratio exceeding 50 on the other hand causes the synthesized α-sialon to have a remarkably-deteriorated crushability because of the entanglement of fibrous particles.

Next, the following section describes a method of synthesizing the .alpha.-sialon phosphor of the present invention. In the synthesization process of the .alpha.-sialon, the reaction of a part of the raw material powders provides a liquid phase through which the respective elements move to thereby promote the formation of the solid solution and the grain growth. Thus, the liquid phase generated in the synthesization process has a significant influence on the particulate shape. The inventor has paid attention on the particulate shape in addition to the solid solution composition to investigate the composition ratio of the raw material powders, thus finding that the particulate shape significantly changes depending on the ratio between the nitride and the oxide (including compounds that turn into heated oxides) of the Ca raw material and the total amount thereof. This ratio is different depending on the Si/Al ratio and thus cannot be uniformly defined. However, specifically, high Ca content is preferable. It is also preferable that the Ca raw material mainly includes calcium nitride ($Ca_3N_2$) powders and, in consideration of oxides inevitably included therein, the $CaO/Ca_3N_2$ ratio in the Ca raw material (molar ratio) is within a range from 0.04 to 0.3. By maintaining the $CaO/Ca_3N_2$ ratio to be within this range, the aspect ratio can be 2 or more and 50 or less. The $CaO/Ca_3N_2$ ratio exceeding this range causes the primary particles to be thin or to be sintered, which is not preferred.

In order to obtain particles having a high aspect ratio, it is effective to cause Ca to be solid-soluted. However, it is also possible to partially substitute Ca with Li, Mg, and Y as well as lanthanide elements (except for La and Ce) to fine-tune the light-emitting spectrum.

As raw material other than the above ones, powders of silicon nitride, aluminum nitride, and Eu compound are used. With regard to the Eu compound, in order to reduce the oxygen amount in the system, europium nitride is preferred. However, since the amount of the addition of the Eu compound is small, europium oxide or a compound that turns into europium oxide after being heated also may be used.

When an appropriate amount of previously-synthesized α-sialon powders is added as a raw material, this can function as a base point for the grain growth, thus providing α-sialon having a relatively-large diameter in the short axis direction.

The above-described respective raw materials can be mixed by a dry blending method or a method of subjecting the respective components of the raw material to a wet blending in an inactive solvent that substantially not react therewith to subsequently remove the solvent for example. A mixing apparatus for mixing the respective raw materials is preferably a V-blender, a rocking mixer, balls mill, a vibrational mill or the like. However, calcium nitride that is unstable in air is preferably mixed in a glove box including an inactive atmosphere because the hydrolysis and oxidation thereof has an influence on the characteristic of the synthesized matter.

The phosphor can be obtained by filling powders obtained by being mixed to achieve a desired composition (hereinafter simply referred to as raw material powders) into a container made of material having a low reactivity (e.g., a boron nitride-made container) to heat the powders in a nitrogen atmosphere for a predetermined time in a temperature range from 1650 to 1850 degrees C.

By setting the heat treatment temperature to a temperature of 1650 degrees C. or higher, the amount of remaining unreacted products can be suppressed and the primary particles can be allowed to sufficiently grow. By setting the heat treatment temperature to a temperature of 1850 degrees C. or less, a remarkable sintering among particles can be suppressed.

The raw material powders are preferably filled into the container in such a manner that the raw material powders are bulky in order to suppress the sintering among particles during heating. Specifically, the raw material powders are preferably filled in the container with a bulk density of 0.6 g/cm³ or less.

The heating time in the heat treatment should be selected in a range within which any inconvenience can be prevented such as a large amount of unreacted matters, insufficiently-grown primary particles, or the sintering among particles. According to the examination by the inventors, the heating time is preferably within a range from 2 to 24 hours.

The α-sialon obtained through the above-descried operation must be adjusted within a required particle size range depending on the application. Particles within the above-described aspect ratio range are composed of particles having a state close to a single crystal state. Thus, the particles can be broken by a relatively-weak force and thus the particle size can be easily controlled by merely adjusting the pulverization force and the reduction of the fluorescent characteristic due to pulverization is lowered. Although a high aspect ratio is required to synthesize the α-sialon, the particulate shape after the pulverization of the α-sialon when the α-sialon is actually used as a phosphor is not particularly limited.

The method as described above can provide such α-sialon that has large primary particles, that has a superior crystallinity, and that has a high aspect ratio. The α-sialon obtained by the method of the present invention has large primary particles and a high aspect ratio. Thus, a weak sintering force can be caused among the particles. Thus, the secondary particles can be easily dissociated by grinding and pulverization processings.

With regard to the particle size distribution of the phosphor, D50 measured by a laser diffraction-scattering within a range from 5 to 20 μm, D10 measured by a laser diffraction-scattering within a range from 2 to 15 μm, and D90 measured by a laser diffraction-scattering within a range from 6 to 50 μm can provide a favorable fluorescent characteristic and can allow the phosphor to be used as an LED phosphor.

The light-emitting apparatus of the present invention is composed of a light source and the α-sialon of the present invention having a superior fluorescent characteristic that emits visible light upon receiving the light emitted from the light source. The light-emitting apparatus includes an LED lighting apparatus, a fluorescence lamp or the like. Known methods as disclosed in JP H5-152609 A and JP H7-099345 A for example can be used to use the α-sialon of the present invention to manufacture the light-emitting apparatus of the present invention.

In the light-emitting apparatus of the present invention, the α-sialon of the present invention also may be combined with a phosphor having another light-emitting characteristic to provide a lighting apparatus emitting a desired color.

Example 1

The following section describes the present invention in further detail based on examples and comparison examples.

Example 1 and Comparison Example 1

Calcium nitride powders made by Kojundo Chemical Laboratory Co. were opened in a glove box under a nitrogen atmosphere to fill the calcium nitride powders into a tin capsule for an oxygen/nitrogen analysis to subject the tin capsule to a weighing. Then, the tin capsule was placed in a sealed container and was removed from the glove box. Then, the tin capsule filled with the calcium nitride powders was immediately set in an oxygen nitrogen simultaneous analysis apparatus (TC-436) made by LECO to analyze the oxygen content. The oxygen content of calcium nitride powders having a different production lot was measured. In this manner, the calcium nitride powders (1) having an oxygen content of 1.1 mass % and the calcium nitride powders (2) having an oxygen content of 0.3 mass % were obtained.

Raw material powders obtained by blending silicon nitride powders made by Ube Industries, Ltd. (E10 grade) of 71.6 mass %, aluminum nitride powders made by Tokuyama Corporation (E grade) of 25.8 mass %, and europium oxide powders made of Shin-Etsu Chemical Co., Ltd. of 2.6 mass % were subjected to a wet blending in ethanol solvent by a silicon nitride-made pot and balls for one hour. The resultant slurry was subjected to suction filtration to remove the solvent and was dried, thereby obtaining premixed powders.

Next, the premixed powders were placed in a glove box under a nitrogen atmosphere and were mixed with the calcium nitride powders (1) in a mortar, thereby obtaining raw material mixed powders of Example 1. The premixed powders were mixed with the calcium nitride powders (2) in a mortar, thereby obtaining raw material mixed powders of Comparison Example 1. The mixing ratio in both of Example 1 and Comparison Example 1 was set to the mass ratio between the premixed powders and the calcium nitride powders=87.1:12.9. The $CaO/Ca_3N_2$ ratio in Example 1 was 0.096 and the $CaO/Ca_3N_2$ ratio in Comparison Example 1 was 0.028.

The raw material mixed powders were sent through a 250 μm-mesh sieve similarly in the glove box and subsequently filled in a boron nitride-made crucible. Then, the crucible was subjected to a heat treatment by an electric furnace by a carbon heater in a nitrogen atmosphere of atmospheric pressure at a temperature of 1750 degrees C. for 16 hours. The calcium nitride included in the raw material mixed powders is easily hydrolyzed in air. Thus, the crucible in which the raw material mixed powders were filled was removed from the glove box and was immediately set on the electric furnace and then immediately subjected to evacuation to thereby avoid the reaction of calcium nitride. Example 1 showed a larger reduction of the weight during the sintering process.

The synthesized matters obtained through the heat treatment in Example 1 and Comparison Example 1 were subjected to a slight grinding in a mortar, respectively and then the synthesized matters were entirely sent through a 150 μm-mesh sieve to thereby obtain phosphor powders. According to the investigation of the crystalline phase by an X-ray diffraction measurement of powders using a CuKα ray, the phosphors of Example 1 and Comparison Example 1 both included a crystalline phase of an α-sialon single phase.

A method of measuring the lattice constant by an XRD diffraction is not limited. For example, a method may be used to subject a sample and an internal standard material to mixing and pulverization to measure the lattice constant by an X-ray diffraction apparatus. The internal standard material may be generally aluminum oxide, magnesium oxide, or silicon for example but may be preferably the one that has a peak not overlapped with the peak of the sample. After the X-ray diffraction measurement, lattice constant analysis software is used to find a precise lattice constant. Analysis software may be JADE made by Rigaku Corporation for example. The lattice constant of the present invention was measured based on JIS K0131. As a result, the α-sialon of Example 1 showed the lattice constant a of 0.7929 nm and the lattice constant c of 0.5754 nm. The α-sialon of Comparison Example 1 showed the lattice constant a of 0.7919 nm and the lattice constant c of 0.5746 nm.

Figure 1:
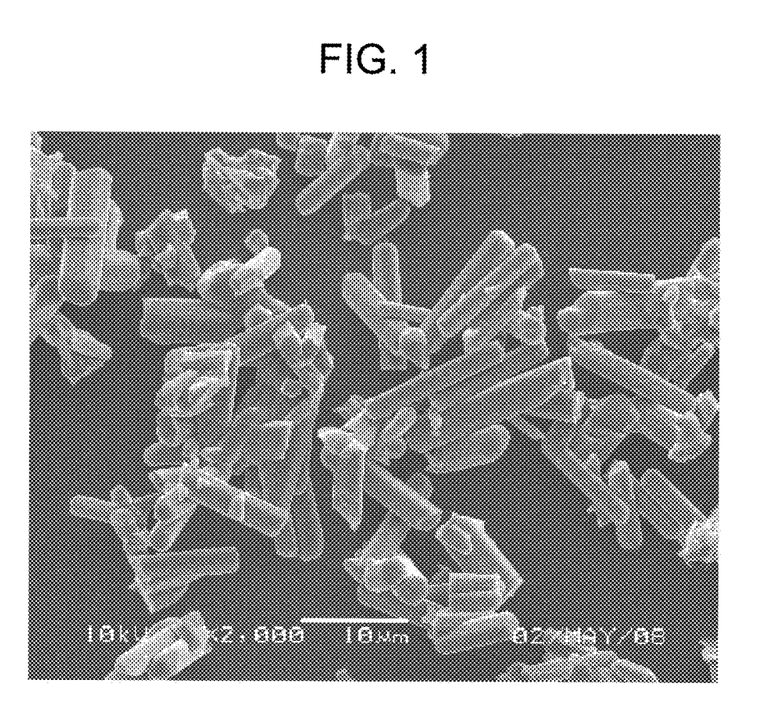
FIG. 1 is a scanning electron microscope (SEM) image of phosphor according to Example 1 of the present invention.
Figure 2:
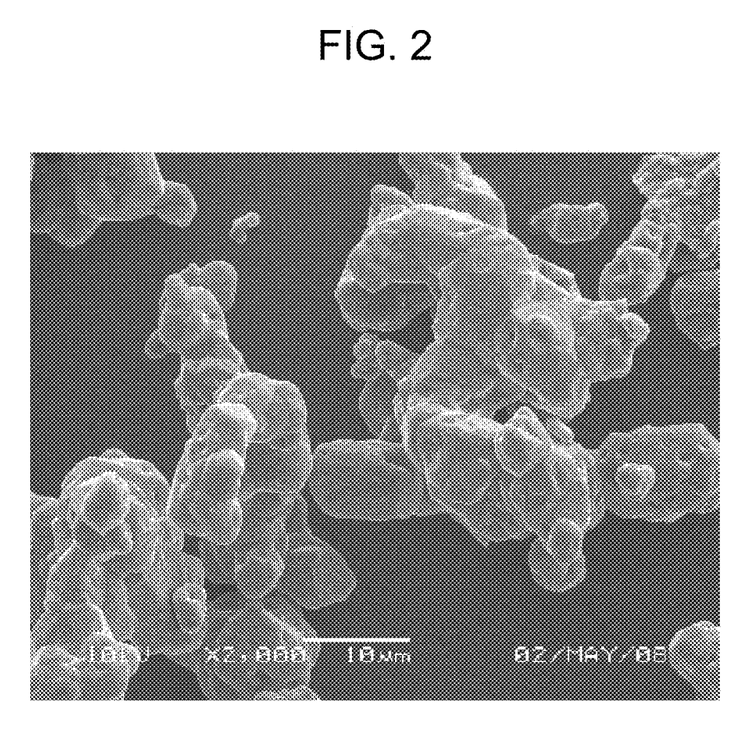
FIG. 2 is a SEM image of phosphor according to Comparison Example 1.

The phosphor powders were observed by a scanning electron microscope (SEM). The SEM images of Example 1 and Comparison Example 1 are shown in FIG. 1 and FIG. 2, respectively. The phosphor of Example 1 is composed of columnar particles having a primary particle diameter (short axis diameter) of about 3 to 5 μm that is distributed within a relatively-narrow range. With regard to an SEM image, the long axis diameters and short axis diameters of the individual primary particles can be easily calculated. The calculated aspect ratio (long axis diameter/short axis diameter) was 4.2 in average. On the other hand, the phosphor of Comparison Example 1 is composed of a plurality of particles having a relatively-small aspect ratio that are sintered strongly. An SEM image can provide only information regarding the particles at the surface that constitute the secondary particles. An average aspect ratio calculated based on this information was 1.4. Comparison Example 1, which the $CaO/Ca_3N_2$ ratio is lower than 0.04, shows an average aspect ratio of 2 or less. Specifically, it can be seen that the smaller the $CaO/Ca_3N_2$ ratio is, the smaller the average aspect ratio is.

The oxygen and the Eu contents measured by an O/N analysis apparatus and an ICP emission spectrochemical analysis were 0.78 and 1.2 mass % in Example 1 and were 0.98 and 1.7 mass % in Comparison Example 1, respectively.

Figure 3:
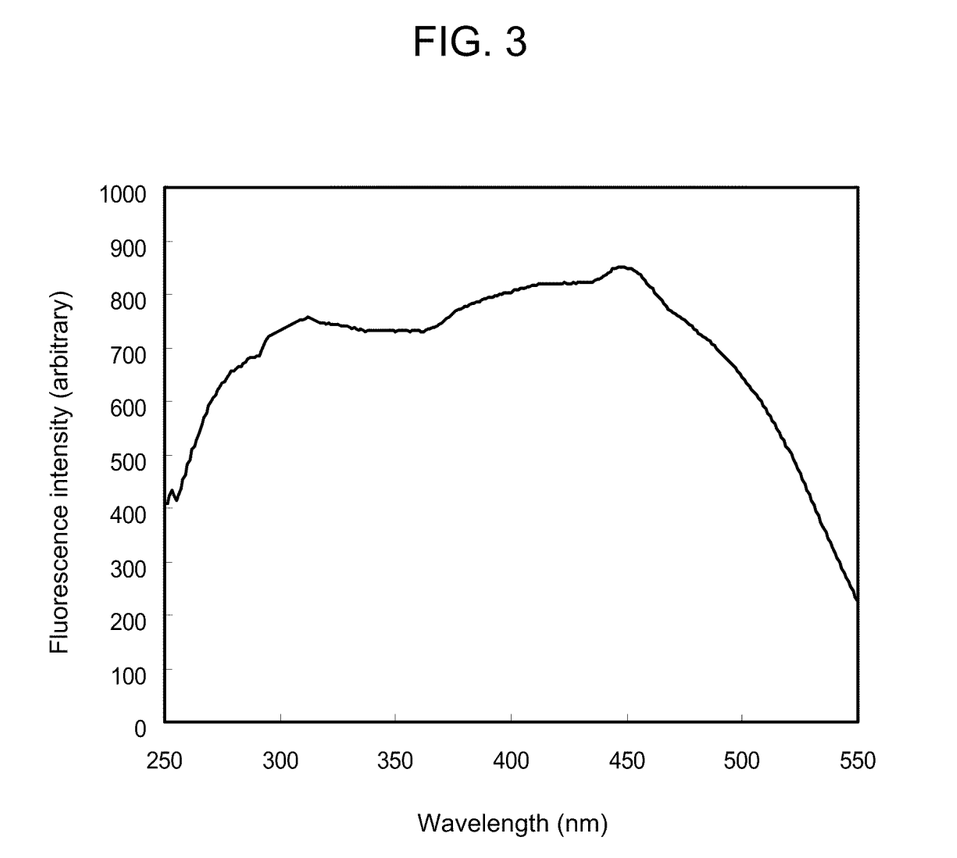
FIG. 3 shows the excitation spectrum of the measurement of the fluorescence intensity at a wavelength of 600 nm of the phosphor according to Example 1.

Next, a spectrophotofluorometer (F4500) made by Hitachi High-Technologies Corporation was used to measure the excitation spectrum. FIG. 3 is the excitation spectrum of the phosphor of Example 1. The phosphor of the present invention is excited in a wide wavelength region of ultraviolet rays to visible light. Since phosphor of the present invention is efficiently excited by light in a wavelength from 400 to 470 nm in particular, the phosphor of the present invention is suitable for a light-emitting apparatus that uses near-ultraviolet light and blue LED as an excitation source. The above-described spectrophotofluorometer was used to measure the peak intensity, the peak wavelength, and the half bandwidth of the fluorescent spectrum at the excitation by blue light (having a wavelength of 455 nm). Since the peak intensity changes depending on a measurement apparatus or conditions, the peak intensity is represented by a relative value when assuming that the peak intensity of Example 1 is 100. The peak intensity, the peak wavelength, and the half bandwidth of Example 1 were 100, 601 nm, and 84 nm, respectively. The peak intensity, the peak wavelength, and the half bandwidth of Comparison Example 1 were 88, 605 nm, and 85 nm, respectively. It can be understood that a low fluorescence intensity is caused when the primary particles have a columnar shape and the average aspect ratio is 2 or less.

Example 2

Raw material powders obtained by blending silicon nitride powders made by Ube Industries, Ltd. (E10 grade) of 71.1 mass %, aluminum nitride powders made by Tokuyama Corporation (E grade) of 25.7 mass %, calcium carbonate powders (Wako Pure Chemical Industries, Ltd., special grade reagent) of 0.7 mass %, and europium oxide powders made by Shin-Etsu Chemical Co., Ltd. of 2.5 mass % were subjected to a wet blending in ethanol solvent by a silicon nitride-made pot and balls for one hour. The resultant slurry was subjected to suction filtration and the solvent was removed and drying was performed, thereby obtaining premixed powders. Next, the premixed powders were placed in a glove box under a nitrogen atmosphere and were mixed with the calcium nitride powders (2) in a mortar, thereby obtaining raw material mixed powders. The mixing ratio was set to the mass ratio between the premixed powders and the calcium nitride powders=87.6: 12.4. This compounding ratio is the same as that of Example 1 when assuming that calcium nitride impurity oxygen is calcium oxide. The CaO/Ca$_3$N$_2$ ratio was 0.102. The CaO/Ca$_3$N$_2$ ratio was calculated based on an assumption that calcium carbonate (CaCO$_3$) is decomposed into calcium oxide (CaO).

The raw material mixed powders were subjected to the same processing as in Example 1 to thereby obtain phosphor powders. The result of the X-ray diffraction measurement of the powders showed that the existing crystalline phase was an α-sialon single phase, the lattice constant a was 0.7927 nm, and the lattice constant c was 0.5752 nm. Oxygen and the Eu contents were 0.89 and 1.3 mass %, respectively.

Figure 4:
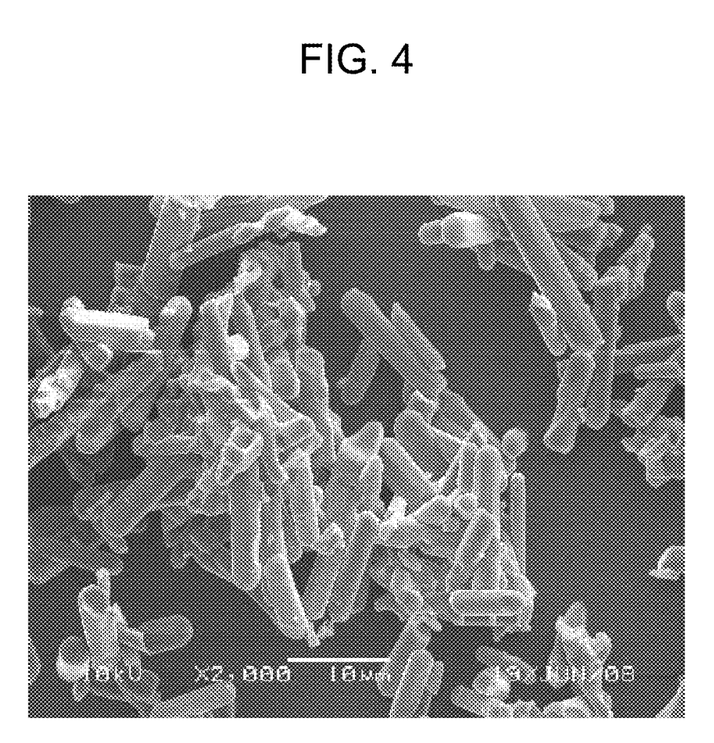
FIG. 4 is a SEM image of the phosphor according to Example 2.

FIG. 4 is an SEM image of the phosphor powders obtained in Example 2. The phosphor is composed of columnar particles having a particle diameter (short axis diameter) of about 3 to 5 μm and the particle diameters are distributed within a relatively narrow range. The average aspect ratio of the primary particles constituting the phosphor calculated based on the SEM image was 3.9. The peak intensity, the peak wavelength, and the half bandwidth of the fluorescent spectrum at the excitation at a wavelength of 455 nm were 98, 601 nm, and 84 nm, respectively.

Comparison Example 2

As a blending composition of raw material powders, raw material powders obtained by blending silicon nitride powders made by Ube Industries, Ltd. (E10 grade) of 58.4 mass %, aluminum nitride powders made by Tokuyama Corporation (E grade) of 15.1 mass %, calcium carbonate powders (Wako Pure Chemical Industries, Ltd., special grade reagent) of 24.4 mass %, and europium oxide powders made by Shin-Etsu Chemical Co., Ltd. of 2.1 mass % were subjected to a wet blending in ethanol solvent by a silicon nitride-made pot and balls for one hour to thereby obtain slurry. Then, the resultant slurry was subjected to suction filtration and the solvent was removed and drying was performed, thereby obtaining raw material mixed powders. This compounding ratio is one which calcium nitride of Example 1 is substituted with calcium carbonate. The raw material mixed powders were subjected to the same processing as in Example 1. The phosphor after sintering significantly contracted due to sintering. Then, the powders were subjected to a pulverization processing by a mortar until all of the powders have passed a 150 μm-mesh sieve. The result of the X-ray diffraction measurement of the powders showed that the resultant phosphor powders included a crystalline phase of AlN and a non-identifiable crystalline phase as well as α-sialon. The α-sialon showed the lattice constant a of 0.7848 nm and the lattice constant c of 0.5689 nm. According to the SEM observation of the phosphor powders of Comparison Example 2, the phosphor was composed of the isometric secondary particles of strongly-sintered fine primary particles. In the case of Comparison Example 2 having a high CaO/Ca$_3$N$_2$ ratio, it was difficult to calculate an average aspect ratio because the primary particles were sintered.

The peak intensity, the peak wavelength, and the half bandwidth of the fluorescent spectrum at the excitation at a wavelength of 455 nm were 57, 589 nm, and 91 nm, respectively. As can be seen from the results of Example 2 and Comparison Example 2, primary particles having a columnar shape provide a high fluorescence intensity. In the case of Comparison Example 2, the oxygen content was 3.8 mass % and the Eu content was 1.8 mass %.

Example 3

Example 3 and Comparison Example 3

The phosphor powders of Example 1 were cracked by a supersonic jet mill (made by Nippon Pneumatic Mfg. Co., Ltd., PJM-80SP), thereby obtaining the phosphor powders of Example 3 and Comparison Example 3, respectively. This mill can control the particle diameter of the pulverized powders by the rate at which a sample is supplied to a pulverization room and a pulverization air pressure. Table 1 shows the pulverization conditions as well as the particle size distribution of the pulverized powders measured by a laser diffraction-scattering.

TABLE 1

| | Pulverization conditions | | | | |
| --- | --- | --- | --- | --- | --- |
| | Sample supply rate | Pulverization air pressure | Particle size distribution (μm) | | |
| | (g/h) | (MPa) | D10 | D50 | D90 |
| Example 3 | 50 | 0.2 | 2.7 | 6.5 | 16.1 |
| Comparison Example 3 | 10 | 0.7 | 0.6 | 1.3 | 5.6 |

The peak intensity, the peak wavelength, and the half bandwidth of fluorescent spectrum at the excitation at a wavelength of 455 nm were 92, 600 nm, and 84 nm in the case of Example 3 and 26, 599 nm, and 84 nm in the case of Comparison Example 3, respectively. Comparison Example 3 showed a significantly declined light-emitting characteristic due to an excessive pulverization.

Example 4

The phosphor powders of Example 3 were subjected to a fine powder removal processing based on the wet sedimentation classification. The phosphor powders of 10 g were sufficiently dispersed in distilled water of 500 ml in which sodium hexametaphosphate was added as dispersant. Then, the resultant liquid was moved to a container having an inside dimension of 80 mm and a height of 140 mm and was subjected to a still standing for 50 minutes. Then, supernatant liquid was removed up to 90 mm from the water surface. Then, sodium hexametaphosphate aqueous solution was added thereto and was dispersed and was subjected to a still standing for a predetermined time. Then, the operation to remove supernatant liquid was repeated until supernatant liquid was transparent. Then, the deposit was filtered and was washed with water in order to remove the dispersant. Then, drying was performed and fine powders were removed, thereby obtaining phosphor powders. The phosphor powders had a particle size distribution for which D10 was 4.8 μm, D50 was 9.1 μm, and D90 was 18.9 μm. The peak intensity, the peak wavelength, and the half bandwidth of the fluorescent spectrum at the excitation at a wavelength of 455 nm were 103, 600 nm, and 84 nm, respectively. When columnar particles are once generated at a synthesization stage, the light-emitting characteristic having the same level as that at the synthesization stage is maintained, even when the particles have a different shape due to pulverization for example, by removing fine powders to thereby allow the final particle size to be within an appropriate range.

INDUSTRIAL APPLICABILITY

The α-sialon phosphor of the present invention is efficiently excited by near-ultraviolet or blue light in particular and shows a light-emitting characteristic having a peak in a wavelength range from 595 to 630 nm. Thus, the α-sialon phosphor of the present invention is suitable as a phosphor for a light-emitting apparatus using near-ultraviolet or blue LED as a light source and is very useful for an industrial purpose.

The light-emitting apparatus of the present invention uses α-sialon phosphor that is heat-resistant and that shows a small temperature change in the light-emitting characteristic. Thus, the light-emitting apparatus of the present invention can be used for a lighting apparatus having a high brightness for a long period of time and is useful for an industrial purpose.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An α-sialon phosphor, comprising: Eu, Si, AL, O, N, and Ca;
   one or more elements selected from the group consisting of Li, Mg, Y, and lanthanide elements, except for La and Ce; and
   a ratio of total number of atoms of Si and Al to O and N being 12 to 16,
   wherein the oxygen content is 1.2 mass % or less, and primary particles constituting the α-sialon have a columnar shape.

2. The α-sialon phosphor according to claim 1, wherein the primary particles have an average aspect ratio of 2 or more and 50 or less.

3. The α-sialon phosphor according to claim 1, wherein the α-sialon has a lattice constant a in a range from 0.785 to 0.800 nm, a lattice constant c in a range from 0.570 to 0.580 nm, and an Eu content in a range from 0.2 to 1.7 mass %.

4. The α-sialon phosphor according to claim 1, wherein, when the α-sialon phosphor shows a fluorescent characteristic having a peak in a wavelength region from 595 to 630 nm by receiving ultraviolet rays or visible light having a wavelength from 250 to 500 nm as an excitation source.

5. Powder-like α-sialon phosphor that is obtained by subjecting the α-sialon phosphor according to claim 1 to grinding or pulverization, wherein the powder-like α-sialon phosphor has a particle diameter distribution 50 volume % diameter (D50) measured by laser diffraction-scattering of 5 μm or more and 20 μm or less.

6. The phosphor according to claim 1, wherein the phosphor has a particle diameter distribution 10% volume diameter (D10) measured by a laser diffraction-scattering of 2 μm or more and 15 μm or less and has a particle diameter distribution 90% volume diameter (D90) of 6 μm or more and 50 μm or less.

7. A light-emitting apparatus comprising a light source and one or more types of phosphors that emit visible light upon receiving light from the light source, wherein the phosphors are the α-sialon phosphor according to claim 1.

8. A method for producing α-sialon phosphor according to claim 1 comprising heating and sintering raw materials including calcium nitride, calcium oxide, silicon nitride, aluminum nitride, and an Eu compound, wherein:
   the $CaO/Ca_3N_2$ molar ratio of the calcium nitride is within the range from 0.04 to 0.3.

9. The α-sialon phosphor according to claim 2, wherein the α-sialon has a lattice constant a in a range from 0.785 to 0.800 nm, a lattice constant c in a range from 0.570 to 0.580 nm, and an Eu content in a range from 0.2 to 1.7 mass %.

10. The α-sialon phosphor according to claim 2, wherein, when the α-sialon phosphor shows a fluorescent characteristic having a peak in a wavelength region from 595 to 630 nm by receiving ultraviolet rays or visible light having a wavelength from 250 to 500 nm as an excitation source.

11. Powder-like α-sialon phosphor that is obtained by subjecting the α-sialon phosphor according to claim 2 to grinding or pulverization, wherein the powder-like α-sialon phosphor has a particle diameter distribution 50 volume % diameter (D50) measured by laser diffraction-scattering of 5 μm or more and 20 μm or less.

12. The phosphor according to claim 2, wherein the phosphor has a particle diameter distribution 10% volume diameter (D10) measured by a laser diffraction-scattering of 2 μm or more and 15 μm or less and has a particle diameter distribution 90% volume diameter (D90) of 6 μm or more and 50 μm or less.

13. A light-emitting apparatus comprising a light source and one or more types of phosphors that emit visible light upon receiving light from the light source, wherein the phosphors are the α-sialon phosphor according to claim 2.

* * * * *